(12) United States Patent
Guedes De Melo et al.

(10) Patent No.: US 7,033,114 B2
(45) Date of Patent: Apr. 25, 2006

(54) METHOD FOR INSTALLING REINFORCEMENTS AROUND A CYLINDRICAL UNDERGROUND PIPELINE

(75) Inventors: Fernando Guedes De Melo, Paris (FR); Benoit Lecinq, Fontenay-aux-Roses (FR); Francois Rapinat, Saint-Maur-des-Fosses (FR); Roger Raymond, Bagneux (FR)

(73) Assignee: Freyssinet International (STUP), (FR)

( * ) Notice: Subject to any disclaimer, the term of this patent is extended or adjusted under 35 U.S.C. 154(b) by 0 days.

(21) Appl. No.: 10/804,261

(22) Filed: Mar. 19, 2004

(65) Prior Publication Data
US 2004/0265068 A1 Dec. 30, 2004

(30) Foreign Application Priority Data
Mar. 20, 2002 (FR) .................................. 03 03416

(51) Int. Cl.
*F16L 1/00* (2006.01)
(52) U.S. Cl. ..................... 405/184.1; 138/99
(58) Field of Classification Search ............ 405/184.1, 405/154.1, 158; 138/97–99, 105, 153, 172, 138/174, 176, DIG. 5
See application file for complete search history.

(56) References Cited

U.S. PATENT DOCUMENTS 5,382,115 A * 1/1995 Jones et al. ................. 405/226
6,336,983 B1 * 1/2002 Fawley ........................ 156/94

FOREIGN PATENT DOCUMENTS

WO      WO 03/014614 A1     2/2003

* cited by examiner

*Primary Examiner*—Sunil Singh
(74) *Attorney, Agent, or Firm*—Banner & Witcoff Ltd.

(57) ABSTRACT

In order to install a reinforcement around a cylindrical underground pipeline, an excavation coffer is laid on the ground above the pipeline, at the same time placing transversely to the pipeline front and rear faces of the coffer, each having along its lower edge an indentation of a shape adapted to the cylindrical shape of the cylindrical pipeline, the coffer is buried in the ground substantially until the indentations are brought up against the pipeline, soil material is removed between the front and rear faces of the coffer in order to give access to an upper part of the wall of the pipeline, a duct in the form of an arc of a circle is engaged under the pipeline, at the same time being pushed along the lower part of the wall of the pipeline, a prestressing reinforcement is threaded into this duct, and the armature is clamped and anchored around the pipeline.

28 Claims, 6 Drawing Sheets

METHOD FOR INSTALLING REINFORCEMENTS AROUND A CYLINDRICAL UNDERGROUND PIPELINE

CROSS REFERENCE TO RELATED APPLICATIONS

This application claims priority to France Patent Application Ser. No. FR 03 03416, filed Mar. 20, 2003, which is incorporated herein by reference in its entirety.

BACKGROUND OF THE INVENTION

The present invention relates to the techniques for reinforcing pipelines and, in particular, to the repair of underground pipelines.

These pipelines are, for example, part of a water supply network. In their commonest form, these pipelines consist of an end-to-end assembly of prestressed concrete pipe segments with a diameter ranging from about 0.5 to 6 meters. Water circulates in them at a pressure which may be about twenty bars. These concrete pipe segments may comprise an inner metal liner. However, the latter is not designed to withstand the pressure forces due to the circulating fluid. These forces are absorbed by the prestressing applied to the concrete by means of wires wound spirally on the outside of the concrete core of the pipe segment. During the prefabrication of such segment, its concrete core is set in rotation about its axis in order to receive the wire which is braked for the purpose of tensioning. This wire is subsequently against corrosion by spraying an additional layer of concrete or mortar over a few tens of millimeters.

In spite of this protecting layer and of the passivation of the steel forming these prestressing wires, it may happens that the prestressing wires experience corrosion which generally leads to a deterioration in the protective coating and therefore to an acceleration of the phenomenon which may cause a break of the wires and therefore a structural embrittlement of the pipeline or even the fracture of the latter under the effect of the pressure of the circulating fluid.

After the damage to one or more segments has been detected by preventive methods (in particular, by acoustic detection), the traditional methods involve first excavating the material (sand, earth or the like) surrounding the damaged segments, then either simply replacing the segments in question, which necessitates draining the supply network beforehand, thus resulting in a considerable detriment to the operation of the network, or manually repairing the outer surface of the pipeline, if the latter has not yet given way.

International Patent Application No. WO 03/014614, the content of which is incorporated herein by reference, discloses a method for repairing a pipeline for the supply of a fluid under pressure, composed of a succession of underground prestressed concrete pipe segments, comprising the steps of:

making a trench in order to free a length of the pipeline;
carrying out a first excavation in the trench under a first pipeline portion substantially centered on a junction between two adjacent segments;
installing and tensioning at least one prestressing reinforcement around the first portion of the pipeline;
filling in the first excavation with soil material and compacting this material;
carrying out a second excavation in the trench under a second pipeline portion adjacent to the first portion and included in a single segment;
installing and tensioning at least one prestressing reinforcement around the second portion of the pipeline; and
filling in the second excavation with soil material and compacting this material.

This method has the advantage of making it possible to restore a damaged zone of the pipeline, whilst at the same time adhering to the technical constraints associated with this type of structure and its operation.

In some cases, however, there may be problems in making the trench. In particular, the operation of the water supply network may necessitate maintaining a relatively high pressure in the pipeline, for example of the order of 10 bar. The removal of the soil around the pipeline then involves a risk, especially if the damage is serious, since there is no longer the reaction of the soil to oppose the internal pressure. This risk is increased because the work carried out in the trench on the pipeline which has not yet been reinforced might trigger a disastrous fracture.

An object of the present invention is to overcome these limitations by proposing a method making it possible to act on an underground pipeline, in at least some phases of the restoration work, without the need to free it over a considerable length.

SUMMARY OF THE INVENTION

The invention thus proposes a method of reinforcing a cylindrical underground pipeline, comprising the steps of:
laying an excavation coffer on the ground above the pipeline, front and rear faces of the coffer being placed transversely to the pipeline, each of said front and rear faces having along a lower edge thereof an indentation of a shape adapted to a cylindrical shape of the pipeline;
driving the coffer into the ground substantially until said indentations are brought up against the pipeline, and removing soil material between the front and rear faces of the coffer to provide access to an upper part of a wall of the pipeline;
further removing soil material under the pipeline from the inside of the coffer; and
installing at least one reinforcement around the pipeline in an interval between the front and rear faces of the coffer.

This method makes it possible to install reinforcements around the pipeline, at the same time freeing it only in its upper part and over a reduced length corresponding to the spacing between the front and rear faces of the excavation coffer. This spacing may be selected so as to be just sufficient to install the reinforcement or reinforcements and to anchor these.

The reinforcement preferably comprises at least one prestressing reinforcement clamped and anchored around the pipeline. However, passive (non-prestressed) reinforcements may be used in certain embodiments of the invention.

In an advantageous embodiment, part of the soil material above the pipeline is removed, before the excavation coffer is laid there. A coffer of standard size can thus be used for various burial depths of the pipeline, the appropriate thickness of soil material being removed.

To make it easier to bury the coffer in the ground, it is advantageous to begin by driving linear guides vertically into the ground on either side of the pipeline. The guides have a horizontal overall size smaller than the coffer as a whole, so that the soil and the pipeline are disturbed to a lesser extent during their burial than if the entire coffer were buried directly. The front and rear faces of the coffer are subsequently slid along these guides in order to complete the burial of the coffer. Moreover, the guides ensure an accurate positioning of the coffer on the pipeline. The linear guides may advantageously comprise sheet piles assembled into two curtains perpendicular to the pipeline on either side of the latter.

A first way of removing the soil material underneath the pipeline is to drive at least one arcuate duct along the pipeline wall, by pushing such duct along a lower part of the wall of the pipeline. The reinforcement can then be threaded into that duct.

The arcuate duct may comprise two sections, each covering substantially one quarter of a revolution, these two sections being pushed towards one another from the two sides of the pipeline in order to meet underneath the pipeline. Alternatively, the arcuate duct covers substantially half of one revolution and is pushed from one side of the pipeline until it appears on the opposite side. This duct may, in particular, consist of a section of one piece profile, the coffer being buried and the soil material being removed so as to give access to more than half a circumference on the upper part of the wall of the pipeline. Preferably, the duct comprises at least one profile section bent in an arc of a circle, having a side open onto the inside of its curvature so as to come up against the wall of the pipeline. Such a duct can be pushed with the aid of at least one actuator placed between a first bearing point fixed with respect to the coffer and a second bearing point mounted on the profile section. In order to effect this push into a confined space, the position of the second bearing point along the profile section may be varied as the push progresses.

The push of the duct may be facilitated by placing in front of the duct, during its engagement under the pipeline, a tool for decohesion of the soil material, for example of the type with a drilling cutter or with compressed air blowing. Soil material is preferably sucked into the duct during the engagement of the latter under the pipeline. Compressed air may also be expelled through ports formed on lateral faces of the duct during the push of the latter under the pipeline.

Another possibility is to carry out preboring, for example a directed borehole, in order to pass a traction cable which will make it easier to introduce the duct. Such directed borehole can be made by means of a metallic nozzle which injects pressurized water into the ground. A device may be added to make the water jet asymmetric, to deviate the borehole along the lower part of the pipeline wall. Such "hydrodemolition" method is advantageous in that it is not very sensitive to the soil condition, and it also avoids to work close to the damaged wires, which would entail risks of propagating the adhesion losses of the wires. It also contributes to cleaning up the pipe before the installation of the reinforcements.

Alternatively, vertical excavations are made on both sides of the pipe inside the coffer, the soil being removed in those excavations up to a depth at least equal to that of the lower part of the pipeline wall. Then, a horizontal excavation is performed by means of an excavation tool such as a conveyor belt carrying cups. Once the soil material has thus been removed from under the pipe between the front and rear faces of the coffer, it is easy to put in place one or more prestressing reinforcements around the pipeline.

Another aspect of the present invention relates to a method of repairing a cylindrical underground pipeline for the supply of fluid under pressure, which comprises installing reinforcements around different sections of the pipeline, the installation of at least one reinforcement around a pipeline section being performed in accordance with a method as defined above.

In such a repair, the installation of the reinforcements can be carried out, with the fluid pressure being maintained within the pipeline.

The reinforcements thus installed may be final reinforcements, the hole occupied by the excavation coffer simply being filled in after the anchoring of the reinforcements.

However, these reinforcements may also be temporary and serve for consolidating the pipeline for the purpose of repairs requiring a larger trench. After the reinforcements have been installed, the trench is then made in order to free a length of the pipeline, repairs are carried out on the surface of the pipeline, and final reinforcements are placed around the pipeline. This work may, in particular, be carried out in the way described in the above-mentioned international patnet application WO03/014614.

BRIEF DESCRIPTION OF THE DRAWING

In the detailed description which follows reference will be made to the drawing comprised of the following Figures.

DESCRIPTION OF THE PREFERRD EMBODIMENTS

Figure 1:
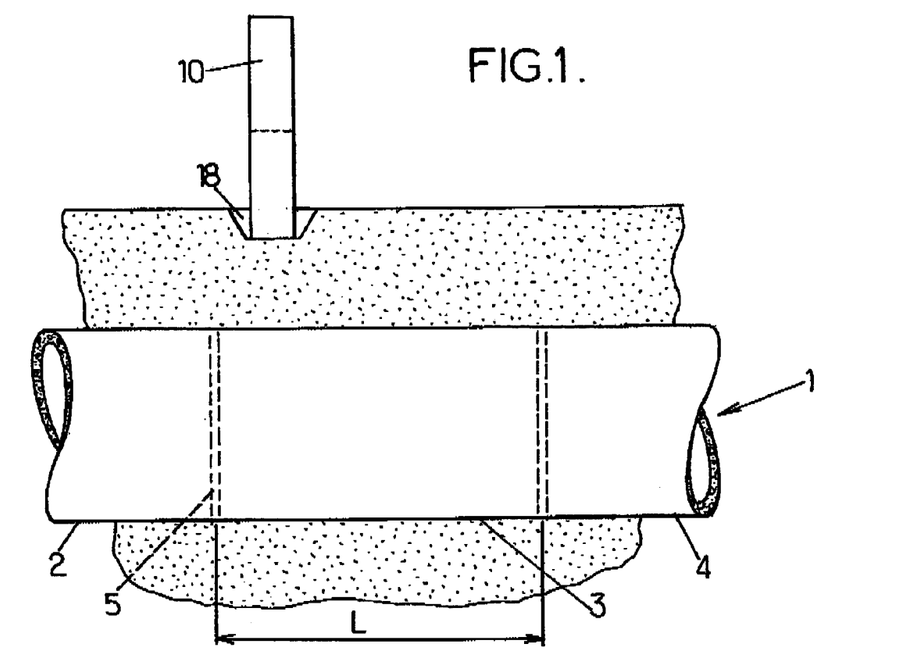
FIGS. 1 and 2 are diagrammatic views of an underground pipeline at a first step of a method according to the invention, respectively in longitudinal section and in cross section in relation to the direction of the pipeline.

FIG. 1 illustrates an underground pipeline 1 formed by a succession of pipe segments 2, 3, 4 assembled end to end. Each of the pipe segments consists, for example, of a concrete core, with a diameter ranging from about 0.5 m to about 6 m, comprising a metal inner liner or not, and with a mean unit length L of, e.g., about 7.5 m.

These segments 2, 3, 4 are for conveying water under a pressure of the order of approximately 20 bar and are for a large part or completely buried in earth or in sand. In this way, the surrounding ground exerts a counterpressure on the outer walls of the segments 2, 3, 4.

In order to improve the resistance of these segments to the fluid pressure, prestressing wires are wound spirally in one or two layers on their outer face and are tensioned during their winding. An additional layer of sprayed mortar or concrete covers these prestressing wires in order to protect them against the corrosive agents which may be present in the ground.

Each of the joints 5 between the segments 2, 3, 4 is formed by fitting a straight end of one of the adjacent segments into a widening provided at the end of the next segment, a sealing mortar being applied along the circumference of the joint. The pipeline 1 thus forms a highly rigid assembly which does not allow bending or shearing forces in the region of the joints.

The corrosion of the prestressing wires as a result of the penetration of aggressive agents into the protective mortar layer may lead to the break of one or more metal wires. Such breaks are generally grouped at points of preferential penetration of the aggressive agents and lead to a delamination and crumbling of the protective mortar layer under the shearing effect. These delaminations are the faults which typically require repair.

In order to repair the pipeline according to the invention, an additional prestress is installed on the outside of the pipeline with the aid of reinforcements arranged around the pipeline and distributed along the repaired zone. These reinforcements are advantageously prestressing strands, preferably individually sheathed strands, thus improving their corrosion resistance.

In order to consolidate the pipeline, whilst maintaining a relatively high internal pressure, it is important not to expose a great length of the pipeline directly. Indeed, the absence of counterpressure from the soil would risk causing the damaged pipeline to give way, with serious consequences for the safety of the work personnel and for the operation of the supply network.

The method according to the invention is used to surround the pipeline with additional reinforcements in order to limit these risks. These additional reinforcements may be laid temporarily, before a trench freeing a relatively great length (typically, several segments of length L) is made or finally, should this be sufficient for the restoration program.

A hollow excavation coffer 10 is placed on the ground above the pipeline and is then buried or driven vertically in order to straddle the pipeline.

The coffer 10 is produced, for example, from steel plates welded to one another. In the embodiment illustrated in FIG. 3, it has a rectangular shape, as seen in a top view, the steel plates forming front and rear faces 11, 12 and two lateral faces 14, 15. The width of the coffer between its front and rear faces 11, 12 is, for example, from one to two meters. Its length between its lateral faces 14, 15 is greater than the diameter of the pipeline 1.

Figure 3:
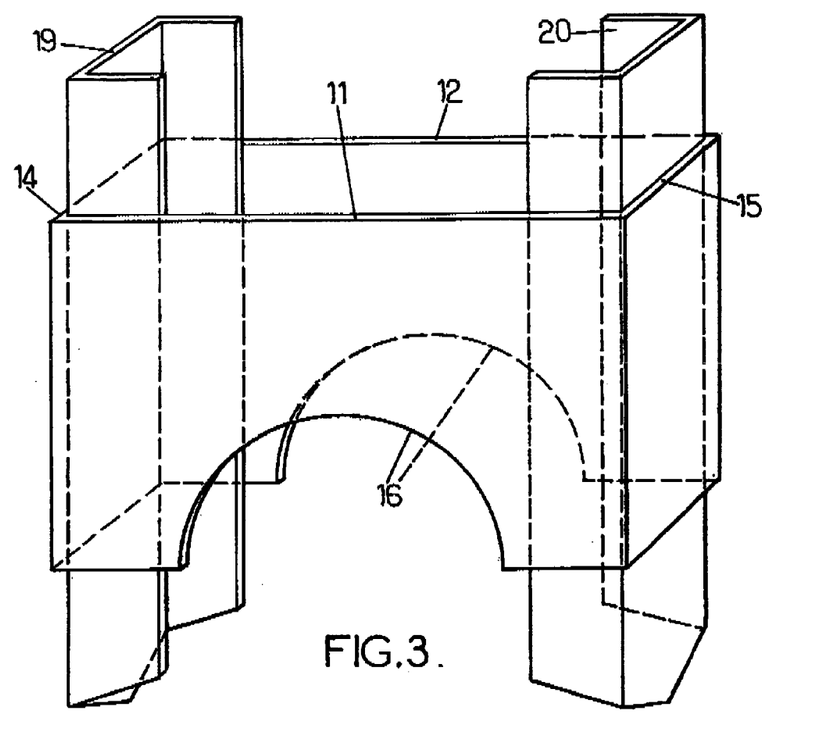
FIG. 3 is a perspective view of an excavation coffer used in this method.

Along its lower edge, each of the front and rear faces 11, 12 of the coffer 10 has a semicircular indentation 16 of the same diameter as the pipeline.

Figure 2:
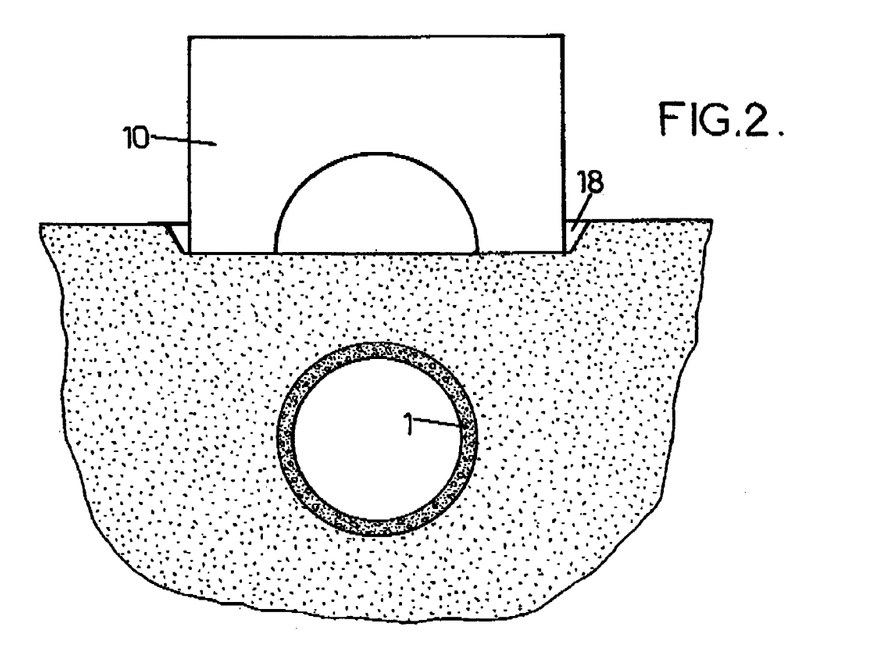

If necessary, a thickness of soil at the surface above the pipeline 1 is first removed (reference 18 in FIGS. 1 and 2), so as to leave, for example, only about 50 centimeters of sand above the pipeline, thus ensuring sufficient safety against the shocks due to the earthmoving appliances. The excavation coffer 10 is subsequently laid on the ground, with its front and rear faces 11, 12 placed transversely to the pipeline.

The coffer 10 is the driven in the ground. Its burial may occur as a result of the coffer's own weight if it is relatively heavy and if the soil is sufficiently loose. Otherwise, an active vibratory ramming system is used in order to bear vertically down on the coffer.

In order to minimize the disturbances of the soil in the burial phase of the coffer 10, the latter may be associated with linear guides 19, 20, for example of the type illustrated in FIG. 3. In this example, these guides are two steel parts of U shaped cross section, with a spacing between its branches which is equal to that provided between the front and rear faces of the coffer 10. These guides 19, 20 are driven vertically into the ground on either side of the pipeline 1 with a spacing between them which is equal to that between the lateral faces 14, 15 of the coffer 10, the base of each U being directed outwards. The positioning of the linear guides buried in the ground is easier to carry out than where the rectangular coffer is concerned.

Once the guides 19, 20 are buried to their positions, the coffer 10 is placed around them, as shown in FIG. 3, and is then driven down, the front and rear faces 11, 12 sliding along the branches of the U shape of the guides.

It will be noted that the steel plates forming the lateral faces 14, 15 of the coffer are optional. After the U guides 19, 20 have been buried, all that is necessary is to bury the steel plates forming the front and rear faces 11, 12 of this coffer.

Figures 4, 5:
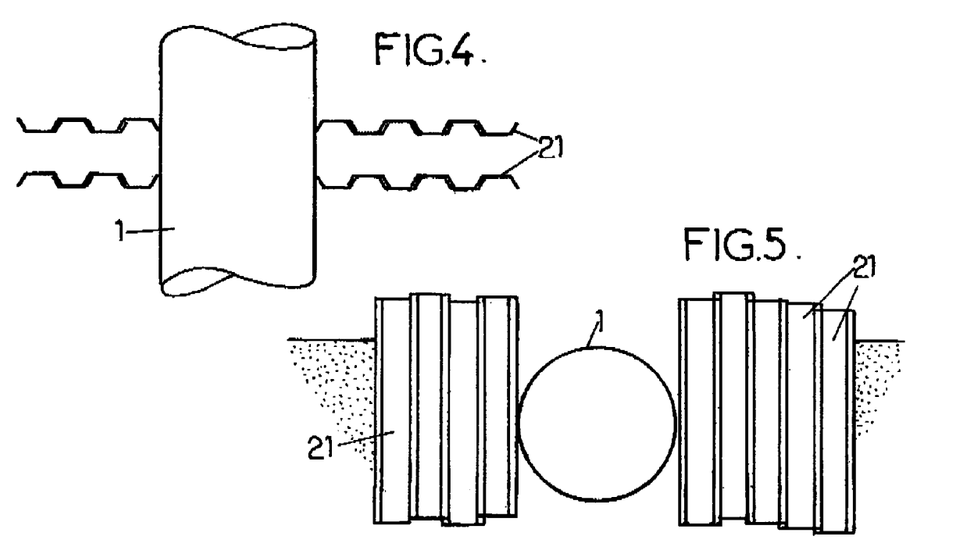
FIGS. 4 and 5 are respectively diagrammatic top and cross sectional views of a sheet pile system making it possible to facilitate the driving of the excavation coffer.

In the alternative embodiment illustrated in FIGS. 4 and 5, the linear guides are in the form of sheet piles 21 which are buried in succession, thereby assembling them into curtains which extend perpendicularly to the pipeline 1. Two sheet pile curtains having a spacing of the order of one meter between them are thus formed on either side of the pipeline in order to retain the sand. The front and rear faces of the coffer which are to overlap the pipeline are subsequently slid along the inner faces of these curtains.

Figure 6:
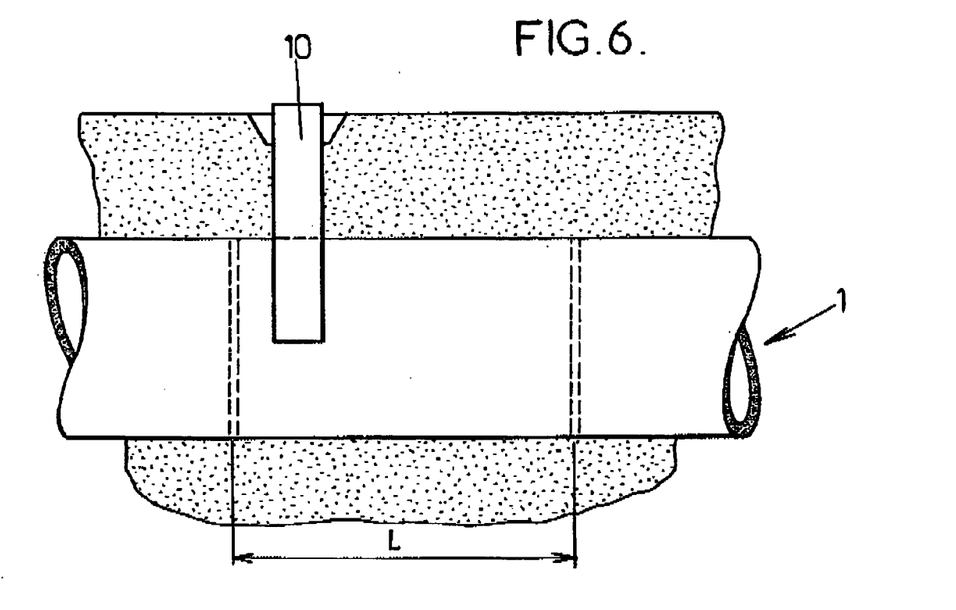
FIGS. 6 and 7 are diagrammatic views of the pipeline, similar to those of FIGS. 1 and 2, at a second step of the method.
Figure 7:
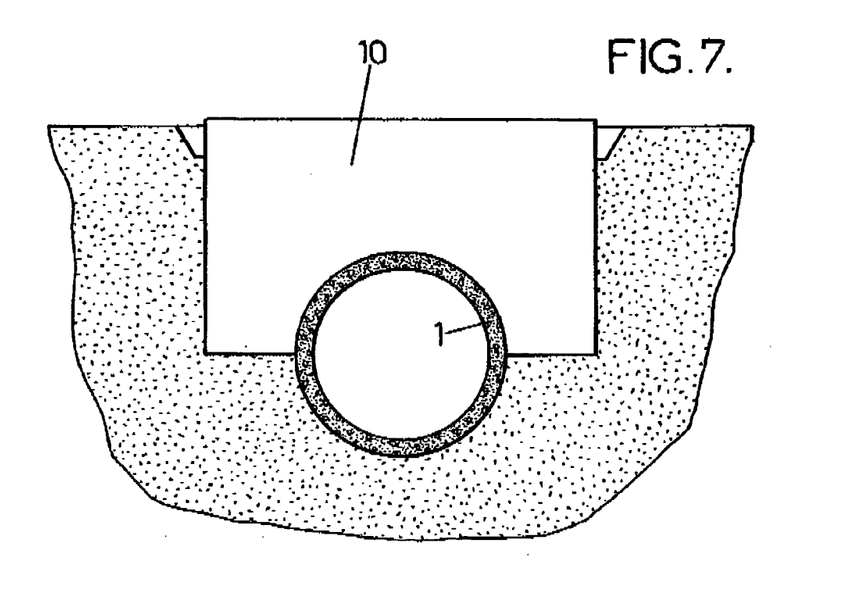

The interior of the excavation coffer 10 is accessible via its upper side. During or after the burial of the coffer into the position illustrated in FIGS. 6 and 7, the sand or other soil material present inside the coffer is removed by means of a mechanical shovel, to provide access to the upper part of the pipeline 1 between the front and rear faces 11, 12.

Figure 8:
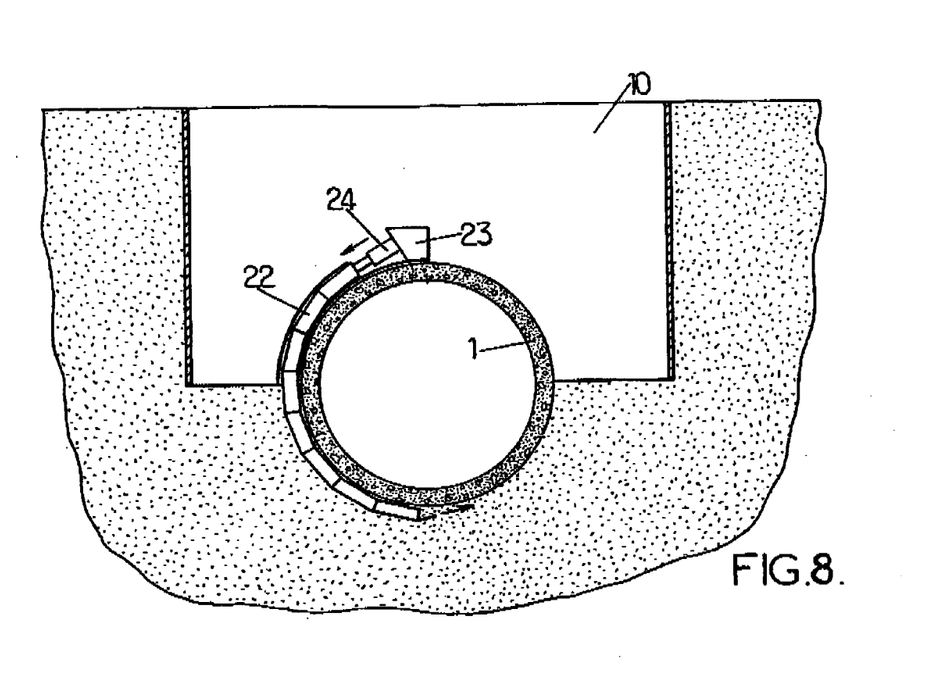
FIG. 8 is a diagrammatic cross sectional view of the pipeline at a third step of the method.

In a first embodiment of the invention, a mechanism for pushing a duct in the form of an arc of a circle 22 under the pipeline is then introduced into the coffer, as shown diagrammatically in FIG. 8. This mechanism comprises two supports 23 which are fastened to the front and rear faces 11, 12 and which serve as bearing points for a jack actuator 24. The jacks 24 push on the duct 22 in order to cause it to penetrate under the pipeline 1 along the outer wall of the latter.

The duct 22 has a U-shaped cross section, with that part which is open onto the inside of its curvature being laid against the wall of the pipeline 1.

In the example of FIG. 8, the arcuate duct 22 is composed of sections assembled end-to-end and pushed on one side of the pipeline 1. The section located at the front of the duct may be equipped with a cutter in order to cause it to lose cohesion with the sand which it meets. This loss of cohesion may also be obtained by compressed air blowing, by percussion or by mechanical disintegration ("tri-cone" system). A suction system, not illustrated, discharges the sand from the duct as the latter advances. The front section may have its upper face beveled, as shown in FIG. 8, in order to lay the duct closely against the wall of the pipeline. The extension of the jacks 24 is followed by their retraction, so as to put in place a new section of the duct 22 which is again pushed by the jacks 24 being extended. This operation is repeated until the front of the duct appears on the opposite side of the pipeline, the duct then extending over approximately a semicircle under the pipeline.

The introduction of the arcuate duct 22 may be facilitated by a cable being passed through a directed borehole made perpendicularly to the pipeline in an oblique direction from the surface of the ground in order to meet the lower side of the pipeline tangentially. This cable makes it possible to exert traction on the duct, at the same time keeping the latter against the pipeline in the ascending part of its path.

Figure 9:
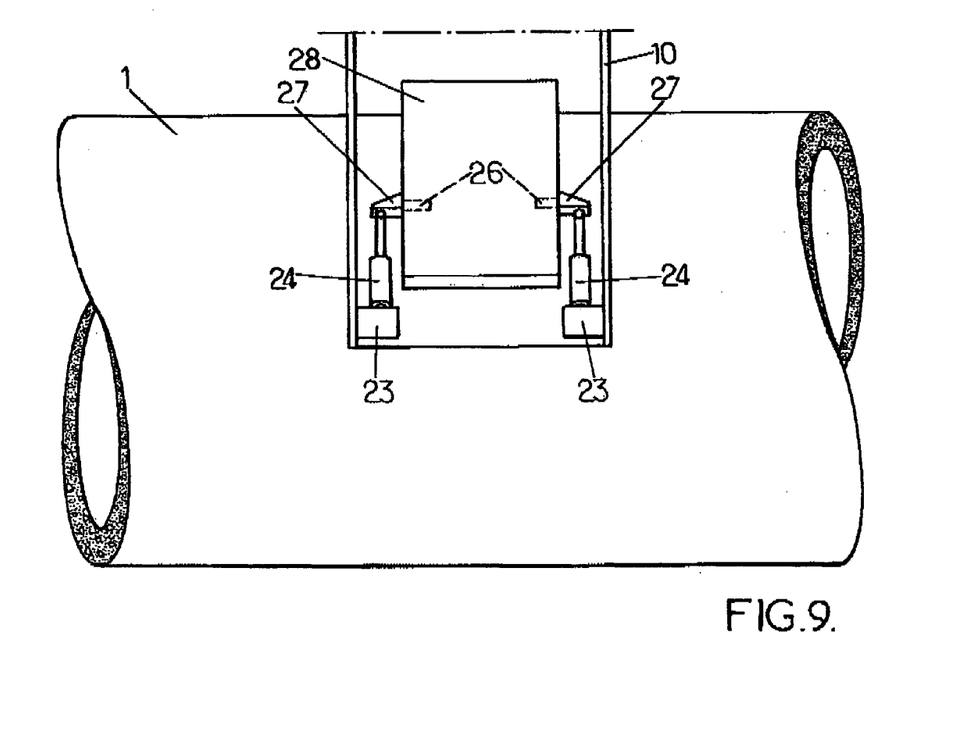
FIGS. 9 and 10 are diagrammatic views of mechanisms for pushing a duct under the pipeline, respectively in longitudinal section and in cross section in relation to the direction of the pipeline.

Alternatively, as shown in FIG. 9, the supports are mounted on the front and rear faces 11, 12 near the bottom of the coffer 10. The duct 28 covers substantially half of one revolution and consists of a bent one piece profile section. On the flanks of this section are provided orifices 25 (see FIG. 10) for receiving bars 26 integral with shoes 27. These shoes 27 form the bearing points of the jacks 24 on the opposite side to the supports 23. After the jacks 24 have been extended, they are retracted, and the shoes 27 are displaced level with the next orifice 25 along the duct 28, before the jacks 24 are brought to bear again and extended once more. In order to leave the space required by the mechanism for pushing the duct, it is then expedient for the coffer 10 to be buried until there is access to more than half a circumference on the upper part of the wall of the pipeline.

Figure 10:
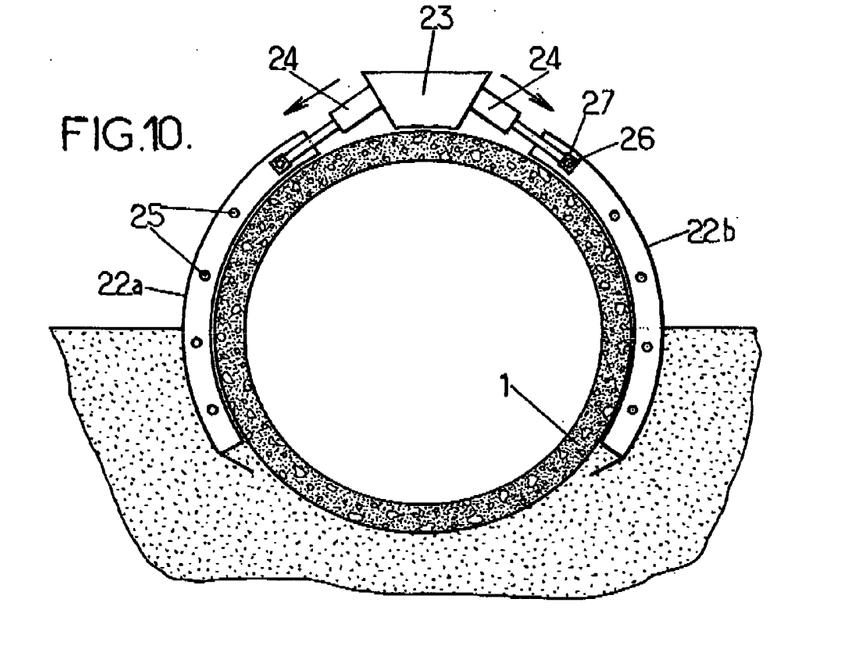

In the example of FIG. 10, the arcuate duct consists of two sections 22a, 22b, each covering approximately a quarter of one revolution. These two sections are pushed symmetrically on either side of the pipeline 1 by two opposite jack mechanisms 24, until they meet again at the base of the pipeline. The advantage of this solution with two symmetrical sections is that it requires a lower driving force. However, the positioning of the half ducts 22a, 22b to ensure that they meet without any error of alignment must be very accurate.

The jack type actuators 24 may be equipped with vibration generating systems in order to make it easier for the ducts to penetrate into the sand.

Furthermore, compressed air may be expelled via orifices formed in the lateral faces of the duct, in order to reduce lateral friction.

Once the duct 22; 22a; 22b; 28 has been put in place, one or more prestressing reinforcements 30 (FIG. 11) are threaded into it, these advantageously consisting of individually sheathed strands, as are currently used in the art of prestressed structures. Each strand 30 can surround the pipeline 1 over one revolution. After clamping to the prescribed tension its ends are anchored with the aid of locking devices placed on the accessible upper part of the pipeline. Such a locking device may be generally X-shaped, with two curved ducts, each intended for receiving one end of a strand. Each of its ducts has a frustoconical mouth suitable for receiving a frustoconical anchoring jaw for locking the end of the strand. In order to tension the latter, the jaws are put in place and a pull is exerted on one of the ends projecting from the locking device (or symmetrically on both ends) with the aid of a jack-type actuator, the jaw being pushed towards the frustoconical mouth. One may also use anchoring devices of the type described in International Patent Application No. WO 02/075069, the content of which is incorporated herein by reference.

Figure 11:
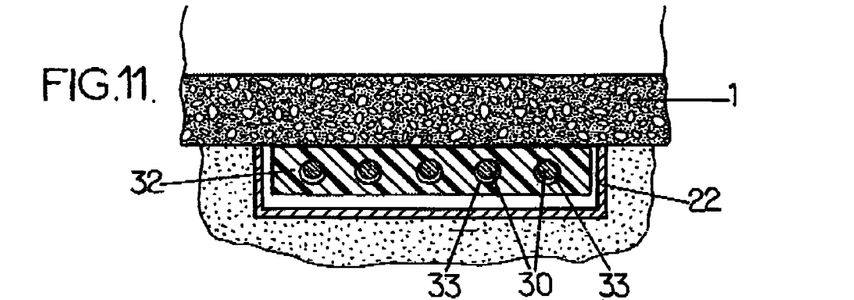
FIGS. 11 and 12 are cross sectional views of two examples of arrangement of prestressing reinforcements placed in the duct around the pipeline.

As shown in FIG. 11, the duct 22 may have inserted into it a flexible belt insert 32 equipped with longitudinal cells 33, each intended for receiving one of the strands 30. This belt prevents the strands from becoming entangled when they are threaded into the duct. It also contributes to distributing the prestressing force on the surface of the pipeline.

Figure 12:
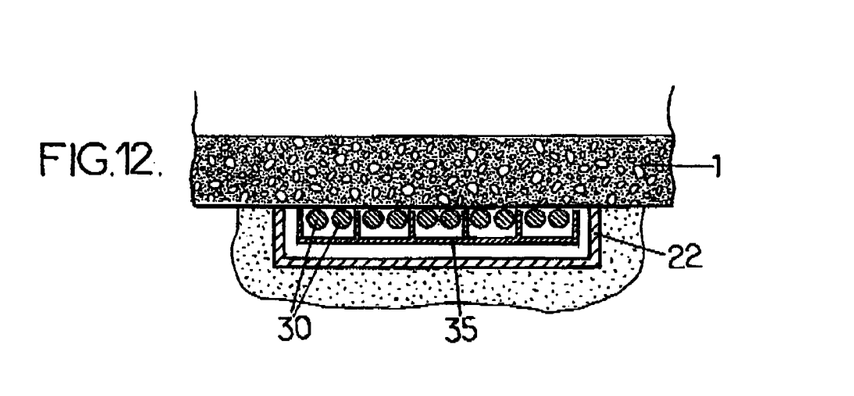

Alternatively, a second multi-cellular duct 35, consisting of a plurality of U-profiles bent according to the radius of the pipeline and juxtaposed, is threaded into the first duct 22. The cells located between the branches of each U make it possible for strands to be threaded directly in contact with the pipeline, while preventing them from becoming entangled. Each cell of this second duct 35 may contain one strand or two strands, as illustrated in FIG. 12.

In a second embodiment of the invention, a directed borehole is drilled to receive the reinforcement, by means of pressurized water.

Figure 13:
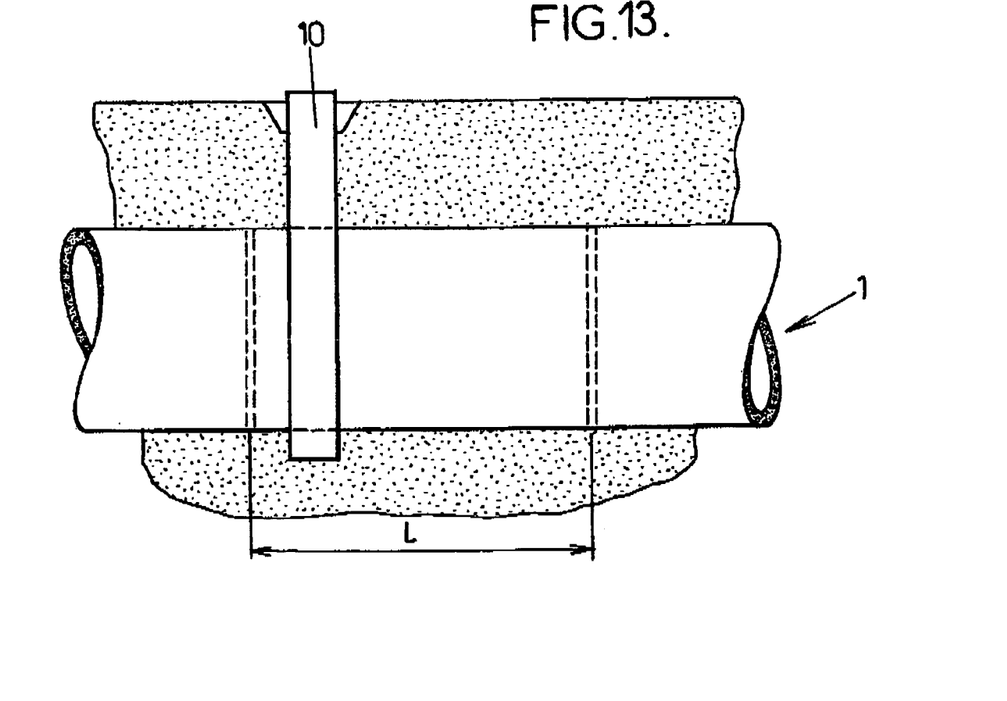
FIGS. 13 and 14 are diagrammatic views showing the pipeline like FIGS. 6 and 7, in an alternative embodiment of the method according to the invention.
Figure 14:
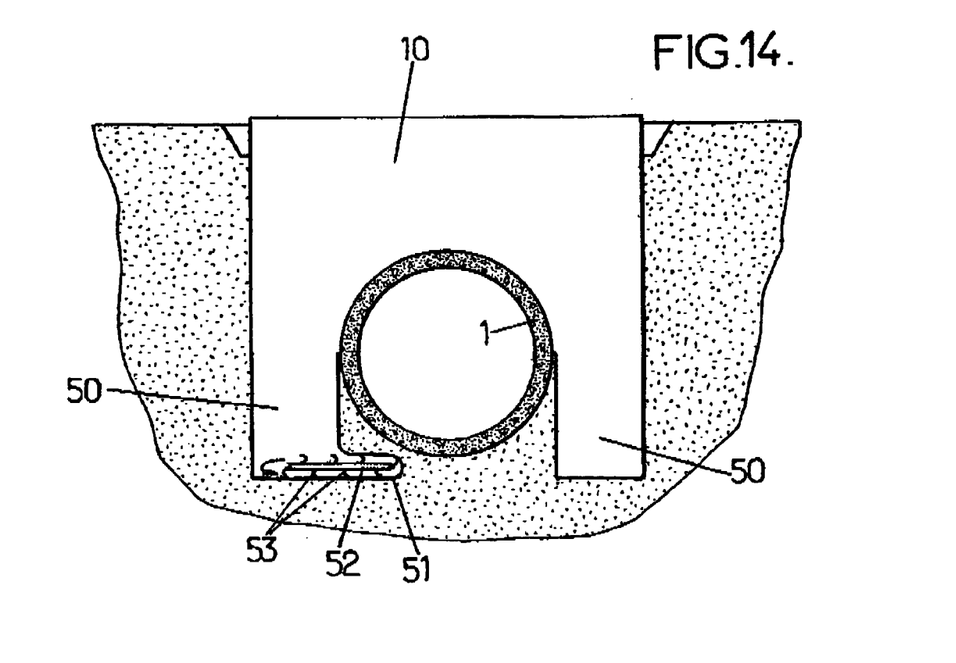

In a third embodiment, once the level of the pipeline has been reached when driving down the coffer 10 and removing the soil material between its faces, two vertical excavations 50 are further made on both sides of the pipeline, as illustrated in FIG. 14. Such vertical excavations 50 can be made from the situation of FIGS. 6 and 7 by means of excavation tools such as drill bits and screw conveyors. It is also possible to provide the excavation coffer 10 with longer legs delimiting the vertical excavations, as shown in FIGS. 13 and 14, and to remove the soil material with a mechanical shovel or the like. A horizontal tunnel 51 is then dug between the two vertical excavations under the pipeline, for example by means of a conveyor belt 52 carrying excavation cups 53. The conveyor belt 52 is driven to cause the cups 53 to transport the soil material to the bottom of the vertical excavations 50 where they are evacuated, e.g. by means of a screw conveyor. Two conveyor belt assemblies may be provided to dig the tunnel 51 form both sides of the pipeline. Once the tunnel is completed, any remaining soil material is wiped from the lower face of the pipeline, and the reinforcement(s) can be put in place.

What is claimed is:

1. A method of reinforcing a cylindrical underground pipeline, comprising the steps of:
    laying an excavation coffer on the ground above the pipeline, front and rear faces of the coffer being placed transversely to the pipeline, each of said front and rear faces having along a lower edge thereof an indentation of a shape adapted to a cylindrical shape of the pipeline;
    driving the coffer into the ground substantially until said indentations are brought up against the pipeline, and removing soil material between the front and rear faces of the coffer to provide access to an upper part of a wall of the pipeline;
    further removing soil material under the pipeline from the inside of the coffer;
    installing at least one reinforcement around the pipeline in an interval between the front and rear faces of the coffer; and
    wherein the step of driving the excavation coffer into the ground comprises a first phase, wherein linear guides are driven vertically into the ground on either side of the pipeline, and a second phase, wherein the front and rear faces of the coffer are slid along said linear guides.

2. The method as claimed in claim 1, further comprising the preliminary step of removing part of the soil material above the pipeline where the excavation coffer is to be laid.

3. The method as claimed in claim 1, wherein the linear guides comprise sheet piles assembled into two curtains perpendicular to the pipeline on either side thereof.

4. The method as claimed in claim 1, further comprising the step of engaging at least one arcuate duct under the pipeline by pushing said duct along a lower part of the wall of the pipeline, said at least one reinforcement being threaded into said duct.

5. The method as claimed in claim 4, wherein the arcuate duct comprises two sections each covering substantially one quarter of a revolution, the two sections being pushed toward one another from two sides of the pipeline in order to meet underneath the pipeline.

6. The method as claimed in claim 4, wherein the arcuate duct covers substantially half of one revolution and is pushed from one side of the pipeline until it appears on the opposite side.

7. The method as claimed in claim 6, wherein the arcuate duct consists of a one-piece profile section, and wherein the coffer is driven into the ground and the soil material is removed so as to give access to more than half of a circumference on the upper part of the wall of the pipeline.

8. The method as claimed in claim 4, wherein the arcuate duct comprises at least one profile section bent in the form of an arc of a circle, having a side open to the inside of the curvature of the duct in order to come up against the wall of the pipeline.

9. The method as claimed in claim 8, wherein the arcuate duct is pushed with the aid of at least one actuator placed between a first bearing point fixed with respect to the coffer and a second bearing point mounted on the profile section.

10. The method as claimed in claim 9, wherein the position of the second bearing point along the profile section is varied as the arcuate duct is being pushed.

11. The method as claimed in claim 4, wherein a tool for decohesion of the soil material is placed in front of the arcuate duct during the engagement of the duct under the pipeline.

12. The method as claimed in claim 4, wherein the step of further removing soil material under the pipeline from the inside of the coffer comprises sucking soil material into the duct during the engagement of the duct under the pipeline.

13. The method as claimed in claim 4, wherein compressed air is expelled through orifices formed on lateral faces of the duct during the push of the duct under the pipeline.

14. The method as claimed in claim 4, further comprising the step of threading into the arcuate duct an insert having at least one cell for receiving a reinforcement or a group of reinforcements.

15. The method as claimed in claim 1, wherein the step of further removing soil material under the pipeline from the inside of the coffer comprises:
  performing vertical excavations on both sides of the pipeline from within the excavation coffer, down to a level deeper than a bottom level of the pipeline;
  digging a horizontal tunnel under the pipeline between the vertical excavations.

16. The method as claimed in claim 1, wherein the horizontal tunnel is dug by means of a conveyor belt carrying excavation cups.

17. A method of reinforcing a cylindrical underground pipeline, comprising the steps of:
  laying an excavation coffer on the ground above the pipeline, front and rear faces of the coffer being placed transversely to the pipeline, each of said front and rear faces having along a lower edge thereof an indentation of a shape adapted to a cylindrical shape of the pipeline;
  driving the coffer into the ground substantially until said indentations are brought up against the pipeline, and removing soil material between the front and rear faces of the coffer to provide access to an upper part of a wall of the pipeline;
  engaging at least one arcuate duct under the pipeline by pushing said duct along a lower part of the wall of the pipeline;
  further removing soil material from the arcuate duct under the pipeline from the inside of the coffer; and
  threading at least one reinforcement into said duct around the pipeline in an interval between the front and rear faces of the coffer.

18. The method as claimed in claim 17, further comprising the preliminary step of removing part of the soil material above the pipeline where the excavation coffer is to be laid.

19. The method as claimed in claim 17, wherein the arcuate duct comprises two sections each covering substantially one quarter of a revolution, the two sections being pushed toward one another from two sides of the pipeline in order to meet underneath the pipeline.

20. The method as claimed in claim 17, wherein the arcuate duct covers substantially half of one revolution and is pushed from one side of the pipeline until it appears on the opposite side.

21. The method as claimed in claim 20, wherein the arcuate duct consists of a one-piece profile section, and wherein the coffer is driven into the ground and the soil material is removed so as to give access to more than half of a circumference on the upper part of the wall of the pipeline.

22. The method as claimed in claim 17, wherein the arcuate duct comprises at least one profile section bent in the form of an arc of a circle, having a side open to the inside of the curvature of the duct in order to come up against the wall of the pipeline.

23. The method as claimed in claim 22, wherein the arcuate duct is pushed with the aid of at least one actuator placed between a first bearing point fixed with respect to the coffer and a second bearing point mounted on the profile section.

24. The method as claimed in claim 23, wherein the position of the second bearing point along the profile section is varied as the arcuate duct is being pushed.

25. The method as claimed in claim 17, wherein a tool for decohesion of the soil material is placed in front of the arcuate duct during the engagement of the duct under the pipeline.

26. The method as claimed in claim 17, wherein the step of further removing soil material under the pipeline from the inside of the coffer comprises sucking soil material into the duct during the engagement of the duct under the pipeline.

27. The method as claimed in claim 17, wherein compressed air is expelled through orifices formed on lateral faces of the duct during the push of the duct under the pipeline.

28. The method as claimed in claim 17, further comprising the step of threading into the arcuate duct an insert having at least one cell for receiving a reinforcement or a group of reinforcements.

* * * * *